United States Patent [19]

Rogoff

[11] Patent Number: 5,055,978
[45] Date of Patent: Oct. 8, 1991

[54] UNIFORM LIGHT SOURCE

[75] Inventor: Gerald L. Rogoff, Framingham, Mass.

[73] Assignee: GTE Products Corporation, Danvers, Mass.

[21] Appl. No.: 459,045

[22] Filed: Dec. 29, 1989

[51] Int. Cl.⁵ .............................................. F21V 8/00
[52] U.S. Cl. ......................................... 362/31; 362/26
[58] Field of Search ............................. 362/26, 31, 32

[56] References Cited

U.S. PATENT DOCUMENTS

| | | | |
|---|---|---|---|
| 4,630,895 | 12/1986 | Abdala, Jr. et al. | 362/31 |
| 4,648,690 | 3/1987 | Ohe | 362/31 |
| 4,729,067 | 3/1988 | Ohe | 362/31 |
| 4,729,068 | 3/1988 | Ohe | 362/26 |
| 4,830,899 | 5/1990 | Nakahashi et al. | 362/31 |
| 4,909,604 | 3/1990 | Kobayashi et al. | 350/345 |
| 4,924,612 | 5/1990 | Kopelman | 362/32 |

FOREIGN PATENT DOCUMENTS 664193  1/1952  United Kingdom ................. 362/31

Primary Examiner—Ira S. Lazarus
Assistant Examiner—Sue Hagarman
Attorney, Agent, or Firm—Wolf, Greenfield & Sacks

[57] ABSTRACT

A light source in which a lamp aperture is arranged to illuminate a large panel provided with a reflective surface by having light rays from the aperture pass through a trough wherein such rays are changed so they are all substantially at angles greater than the critical angle necessary for total internal reflection. Light reflected from the panel is emitted through a window with the aid of light scatterers.

17 Claims, 2 Drawing Sheets

UNIFORM LIGHT SOURCE

FIELD OF THE INVENTION

This invention relates in general to a new light source. More particularly it relates to a light structure which in a preferred embodiment redirects light from a lamp to a substantially flat light emitting surface.

SUMMARY OF THE INVENTION

It is one object of the invention to provide a new uniform light source which can be used for various applications, including general illumination and display backlighting.

It is a further object of the invention to provide a new substantially flat light source consisting essentially of a lamp and a structure for redirecting light emitted from said lamp to a panel of transparent material.

A still further object of the invention is to produce a flat panel diffuse light source.

The above and other features of the invention will now be more particularly described with reference to the accompanying drawings and as will be pointed out in the claims. It is to be understood that the particular structure described is shown by way of illustration only and not as a limitation of the invention. The principles and features of this invention may be employed in varied and numerous embodiments without departing from the spirit and scope of the invention.

DETAILED DESCRIPTION OF THE INVENTION

Figure 1:
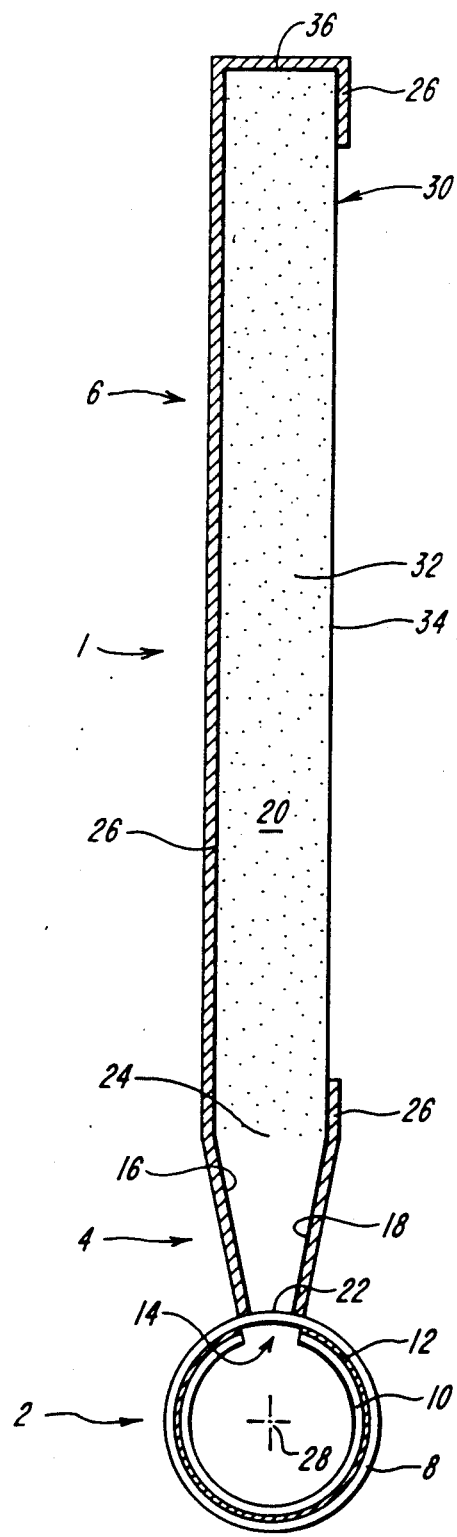
FIG. 1 is a cross-sectional view of the preferred embodiment of the invention.

As shown in FIG. 1 the light source 1 comprises three main elements. A lamp 2 is connected to a light emitter 6 by means of a light transmitter 4. The lamp 2 may conveniently be in the form of a tubular lamp although other shapes of light sources may be employed. The transmitter 4 may be a separate element or may be a portion of the emitter 6. The emitter is in the form of a glass plate which may be ⅜" thick for example, and which has its lower end tapered to form the transmitter portion 4. The edges of the plate are flat and perpendicular to the large planar surfaces of the plate. The size of the emitter 6 can be very large, especially with respect to the size of the lamp 2. Limitations on that size would result from reflection losses, even though most reflections are at shallow angles of incidence or via total internal reflection. Some losses might occur due to volumetric absorption. The emitter 6 may be used for example for general illumination purposes or as display backlighting and may take any desired shape other than the generally rectangular shape shown in cross-section. Also, emitter 6 may employ a curved non flat emitting surface.

The lamp 2, when used in the form of a glass fluorescent tube 8 which is coated on its inner surface with a phosphor coating 10. A portion of the lamp 14 serves as an aperture for light ray emission. This aperture portion may have the phosphor coating 10 on its inner surface or the phosphor can be removed in the portion 14 as shown to present a clear glass portion facing the lower end of the transmitter 4. The lower end of the transmitter 4 may be of arcuate shape as shown at 22 to conform to the shape of the lamp surface. The remaining portions of the tube 8 outside of the aperture 14 are coated with a reflective coating 12 interposed between the glass tube 8 and the phosphor coating 10 which prevents light transmission outside of the tube other than through the aperture 14. This reflective coating is preferably of aluminum, although chromium or rhodium may also be used. The aperture strip extends parallel to the axis 28 of the lamp and for the full length of the transmitter 4.

Figure 2:
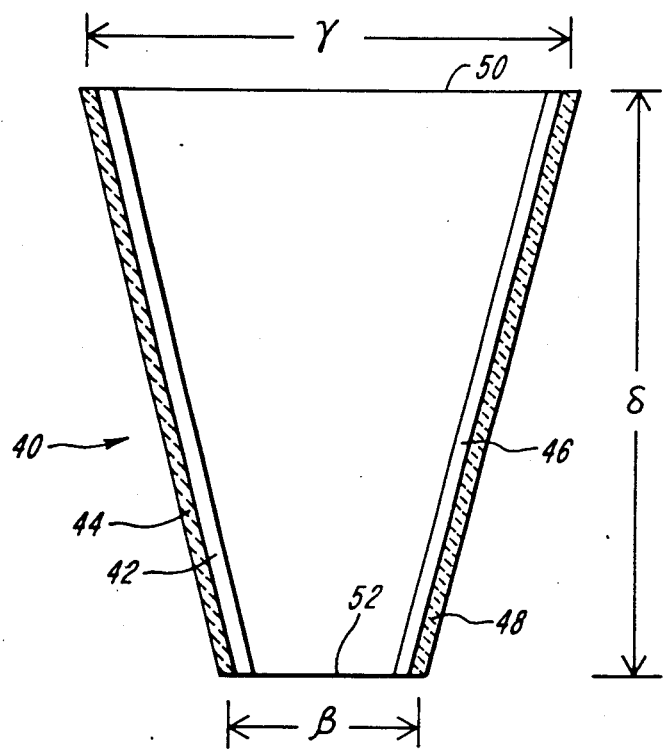
FIG. 2 is a cross-sectional view, illustrating another form of transition member which can be used in the preferred embodiment shown in FIG. 1.

In contact with the aperture 14 is the light transmitter or transition member 4. The transmitter 4 and emitter 6 can be portions of one element, as shown in FIG. 1. Alternately, they may be separate solid elements that are bonded together, or the transmitter may be formed as a hollow trough 40 as shown in FIG. 2. The transmitter portion 4 is basically in the shape of a trough. The transmitter is covered with a reflective coating 26 which for example may be of aluminum, in all portions except at the input section 22 to the transmitter from the lamp and also at the output section 24 of the transmitter where it permits light to be transmitted to the emitter 6.

Alternately, and as shown in FIG. 2, the transmitter 40 may be formed by mirrors which are joined to end panels to form a hollow trough. The mirrors comprise transparent plates 44, 48, e.g., of glass, which have the reflective coatings 42 and 46, respectively, on their inner surface. Similar mirror structure forms the ends of the trough. The end panels should be flat and perpendicular to the panels 44 and 48. With such a construction some light rays emitted from the lamp 2 enter the transmitter 40 at its inlet section 52 and do not hit any solid material until they exit from the outlet section 50 where they impinge upon the bottom of panel 20.

The light transmission member 4 or 40 should be constructed in a specific way so that the angular distribution of the radiation coming from the lamp is altered in such a way that it can be trapped in the plate 20 by total internal reflection at the window 30. With the lamp aperture 14 clear, light will be emitted over a $2\pi$ solid angle, i.e., rays will emerge from the lamp at all angles ranging from directly upward in FIG. 1 to horizontal. The tapered section i.e., the transition member converts that angular distribution of rays to a narrower distribution in the emitter portion 6. In particular, the largest ray angle (with respect to the vertical) emerging from the tapered region should be less than that for total internal reflection at the large parallel flat surfaces of the transparent sheet 20. While the top edge 36 of the sheet 20 as well as the end edges (not shown in FIG. 1) and the tapered surfaces of the transition member 4 do not satisfy the conditions for total internal reflection of all the rays, the reflective coating 26 prevents escape of radiation at those surfaces. Without the use of light scatterers (hereinafter described) an ideal system would allow no light to escape, and radiation emitted from the lamp 2 would be redistributed in angles before reaching the straight section of emitter 6 such that all rays would be trapped and reach a reflecting edge, from which they would reflect, return through the straight region and through the tapered region of transmitter 4 or 40 to the lamp. Since absorption of visible light by the phosphor and discharge should be only slight, most of the returning radiation will eventually leave the lamp again.

The critical angle for total internal reflection $\theta_c$ ($\theta$ measured with respect to surface normal), obtained from Snell's law, is given by $$\theta_c = \sin^{-1}(n_{out}/n_{in}). \quad (1)$$

where $n_{in}$ is the refractive index of the transparent material and $n_{out}$ is that for the outside space. The dimensional relationship for the taper can be written $$\delta = \left(1 - \frac{\beta}{\gamma}\right) \frac{(\gamma/2)(n_{out}/n_{in})}{(\beta/\gamma) - [1 - (n_{out}/n_{in})^2]^{\frac{1}{2}}} \quad (2)$$

where (see FIG. 2) $\beta$ is the width of the taper opening at the lamp interface, $\gamma$ is the width of the larger taper opening at the bottom of the emitter 6 or the outlet section 50 of transmitter 40, and $\delta$ is the length of the tapered region. For a practical situation, Eq. (2) gives a minimum value of $\delta$. Equation (2) is derived from the discussion of cone condensers, for example in the treatise by M. R. Holter, S. Nudelman, G. H. Suits, W. L. Wolfe and George J. Zissis, entitled "Fundamentals of Infrared Technology" (Macmillan, N.Y., 1962), pp. 175, et. seq., which is incorporated herein by reference, or the paper by Donald E. Williamson, entitled "Cone Channel Condenser Optics" printed in the Journal of the Optical Society of America 42, 712 (1952), which is incorporated herein by reference.

The flat panel 20 of transparent material is provided with an outer reflective coating 26 which may for example be of aluminum. The coating 26 extends over the top edge 36 and over the tapered surfaces of the transmitter 4. A portion of the panel 20 is uncoated and forms a clear glass window 30. Embedded in the transparent sheet or panel 20 in the region of the open clear window 30 are uniform but low density distributions of light scatterers 32. These light scatterers are small solid particles, strands of material, random imperfections and/or voids or bubbles which may be embedded in the panel 20 or in a coating put over the clear glass window 30, or may simply be put on the surface of the plate 20 at the clear window 30 o beneath coating 26 opposite the window 30. For example, an epoxy coating having fine silicon powder dispersed therewithin can be employed. In general, any resin could be used as a carrier for such coating. Thus, any light reaching the window will go right through to the coating containing the light scatterers if the coating has the same index of refraction as the plate material. This coating may be sufficiently thick in order to avoid interference effects, e.g., at least several wavelengths.

The scatterers 32 and 34 provide the escape mechanism for the radiation. They alter the propagation directions of the rays, putting some fraction of scattered photons into the angular escape cone determined by the critical angle for total internal reflection. Rays in that cone will escape if they are directed either toward the clear flat surface 30 or toward the parallel back reflective coating 26, and if they experience no additional scattering that might return them to a trapped angle condition. A relatively low density of scatterers is required for uniform emission. A high density would cause too much of the light to be scattered close to the tapered region. It is preferable to have a significant fraction of the light reach the far edge 36 and be scattered on its return trip, or even after returning to the lamp and re-emerging through the transmission member 4.

While the preferred embodiment of the invention has been described and approaches the ideal arrangement, various modifications in the system may be made. For example, the distribution of scatterers 32, 34 may be tailored in various ways to adjust the light distribution from the surface of the window 30. This might be done, for example, to counterbalance any losses due to multiple reflections or absorption. Also, as indicated previously, the system may be constructed so that the plate 20 and the transmitter portion 4 are of one piece, or alternatively these elements can be of separate pieces which are then bonded together. The transition member 4 may be constructed of mirrors, as explained previously. Further, the light emitting surface may be non flat. Additionally a second clear window surface may be provided on the emitter on one or both sides of the plate 20. Should any of these modifications be made, then equation (2) above should be altered to account for refractive effects at interfaces or other changes. This would be particularly true if the transition member 4 is replaced by one with non planar sides. It should be kept in mind that the equation (2) is a result of a two-dimensional analysis for rays lying in a plane transverse to the sides 16 and 18. It does not account accurately for three-dimensional propagation aspects of other rays.

Another variation might be to coat the outside of the clear window 30 in order to improve the surface quality for efficient low-loss internal reflection or to protect the reflecting interface or to provide an additional roughened surface (removed from the interface providing the total internal reflection) to diffuse the emitted light for increased uniformity or to eliminate the overall mirror effect of the plate. The coating should be sufficiently thick to minimize interference effects and should be highly transparent to visible light. The coating should have a refractive index ($n_{out}$) sufficiently different from the plate material to provide good radiation trapping. The coating on the outside of the window could be a resin for example. This coating is transparent in order for light rays to penetrate through the coating material.

In still a further modification, the reflective coating 26 can be removed slightly from the surface of the plate 20 opposite the clear window 30, i.e., on the back panel face, so that light could pass out of the transparent plate and travel some distance through an intermediate space before reaching the metal surface that reflects it back to the clear plate. This would be done in order to reduce reflection losses while still facilitating the escape of scattered radiation. The intervening space may be filled with a low index optical material such as silica or magnesium fluoride.

In order to achieve a reasonably uniform light distribution, the attenuation in the material should be small. As a rough criterion for acceptable attenuation, at least half the light entering the material from the lamp should reach the far edge 36 of the slab 20. If $\alpha$ is the attenuation coefficient and L is the length of the slab, this criterion can be written $$\exp(-\alpha L) >> 0.5, \quad (3)$$

$$\text{or } \alpha << 0.693/L. \quad (4)$$

For a length L of 30 cm, this translates into $\alpha << 0.023$ cm$^{-1}$, while for L=100 cm, $\alpha << 0.007$ cm$^{-1}$. Most available materials easily satisfy both of these conditions.

As a further modification, the lamp 2 may have the aperture 14 coated with a diffuser or, possibly for increased lamp output, with a phosphor. In either case, some rays would leave the aperture surface at angles greater than $\pi/2$ with respect to the vertical. The relationship given by equation (2) above would then have to be modified to accommodate such rays. Additionally, more than one lamp may be used with a single plate 20, or more than one plate may be used with a single lamp. Thus, two lamps may be located at opposite edges of a plate 20 to improve the uniformity of emission from the flat surface, or simply to increase its surface brightness. At each lamp/plate interface however, a lamp aperture must be provided and matched to a taper satisfying the relationships discussed above.

It is clear that other modifications may be made all within the spirit and scope of the present invention.

What I claim is:

1. A light source comprising:
    a lamp having an aperture for emission of light;
    a transition member for receiving light that is emitted through the aperture of said lamp and for transmitting the light through an output thereof; and
    a panel light emitter for receiving light from the output of said transition member, said panel light emitter including a light-emitting surface, scattering means for redirecting light through said light-emitting surface, and total internal reflection means for containing light within said panel light emitter except when said light is incident on said scattering means and is redirected by said scattering means through said light-emitting surface, said panel light emitter comprising a substantially transparent panel, the output of said transition member being optically coupled to an edge of said transparent panel, the aperture in said lamp having a width that is less than the thickness of said transparent panel, said transition member being tapered from the width of said aperture to the thickness of said panel.

2. A light source as defined in claim 1 wherein said scattering means comprises scatterers dispersed in the volume of said transparent panel.

3. A light source as defined in claim 1 wherein said scattering means comprises scatterers on a surface of said transparent panel.

4. A light source as defined in claim 1 wherein said lamp comprises a tubular fluorescent lamp.

5. A light source as defined in claim 1 wherein said transition member comprises a transparent material having reflective tapered surfaces, the dimensions of said transition member being selected such that the light transmitted through said transition member into said transparent panel undergoes total internal reflection on the flat surfaces of the transparent panel.

6. A light source as defined in claim 5 wherein said transition member is integral with said panel light emitter.

7. A light source comprising:
    a lamp having an aperture for emission of light; and
    a panel light emitter for receiving light emitted through the aperture of said lamp, said panel light emitter including a light-emitting surface, scattering means for redirecting light through said light-emitting surface, and total internal reflection means for containing light within said panel light emitter except when said light is incident on said scattering means and is redirected by said scattering means through said light-emitting surface, said panel light emitter comprising a substantially transparent panel and including a transition portion for receiving light that is emitted through the aperture of said lamp, the aperture in said lamp having a width that is less than the thickness of said transparent panel, said transition portion being tapered from the width of said aperture to the thickness of said transparent panel.

8. A light source as defined in claim 7 wherein said scattering means comprises scatterers dispersed in the volume of said transparent panel.

9. A light source as defined in claim 7 wherein said scattering means comprises scatterers on a surface of said transparent panel.

10. A light source as defined in claim 7 wherein said lamp comprises a tubular fluorescent lamp.

11. A light source as defined in claim 7 wherein said transition portion comprises a transparent material having reflective tapered surfaces, the dimensions of said transition portion being selected such that the light transmitted through said transition portion undergoes total internal reflection on the flat surfaces of the transparent panel.

12. A light source comprising:
    a tubular lamp having an elongated aperture for emission of light;
    a transition member for receiving light that is emitted through the aperture of said lamp and for transmitting the light through an output of the transition member; and
    a flat panel light emitter including an edge for receiving light from the output of the transition member, a light-emitting surface, scattering means for redirecting light through said light-emitting surface, and total internal reflection means for containing light within said panel light emitter except when said light is incident on said scattering means and is redirected by said scattering means through said light-emitting surface.

13. A light source as defined in claim 12 wherein said scattering means comprises scatterers dispersed in the volume of said transparent panel.

14. A light source as defined in claim 12 wherein said scattering means comprises scatterers on a surface of said transparent panel.

15. A light source as defined in claim 12 wherein said panel light emitter comprises a substantially transparent panel having flat surfaces.

16. A light source as defined in claim 15 wherein the width of the aperture in said lamp is less than the thickness of said transparent panel and wherein said transition member is tapered from the width of said aperture to the thickness of said panel.

17. A light source as defined in claim 16 wherein said transition member comprises a transparent material having reflective tapered surfaces, the dimensions of said transition member being selected such that the light transmitted through said transition member into said transparent panel undergoes total internal reflection on the flat surfaces of the transparent panel.

* * * * *